United States Patent [19]

Ujiie et al.

[11] Patent Number: 4,918,484
[45] Date of Patent: Apr. 17, 1990

[54] PICTURE FRAME NUMBER DISCRIMINATING METHOD AND APPARATUS THEREFOR

[75] Inventors: Yoichi Ujiie; Syuji Tahara, both of Kanagawa, Japan

[73] Assignee: Fuji Photo Film Co., Ltd., Kanagawa, Japan

[21] Appl. No.: 258,963

[22] Filed: Oct. 17, 1988

[30] Foreign Application Priority Data

Oct. 16, 1987 [JP] Japan .................. 62-261043

[51] Int. Cl.$^4$ ............................. G03B 27/52
[52] U.S. Cl. ......................... 355/41; 355/77
[58] Field of Search ............. 355/40, 41, 77; 250/559, 561, 571

[56] References Cited

U.S. PATENT DOCUMENTS 4,825,387  4/1989  Ono ................... 355/40 X

FOREIGN PATENT DOCUMENTS 52-111718  9/1977  Japan .
56-128933  10/1981  Japan ................ 355/41

Primary Examiner—L. T. Hix
Assistant Examiner—D. Rutledge
Attorney, Agent, or Firm—Sughrue, Mion, Zinn, Macpeak & Seas

[57] ABSTRACT

A photographic film is printed with numerical frame numbers and corresponding coded frame number bar codes. When a sensor completely reads a frame number bar code, a transportation quantity measuring unit starts measuring the transportation of the film to obtain a distance between the center of the film mask and the read frame number bar code or the associated frame number. The number of frames between the distance is obtained through division of the obtained distance by the pitch between frame number bar codes or frame numbers. A frame number of a frame positioned at the film mask is discriminated based on the obtained number of frames and the read frame number.

11 Claims, 6 Drawing Sheets

PICTURE FRAME NUMBER DISCRIMINATING METHOD AND APPARATUS THEREFOR

FIELD OF THE INVENTION

The present invention relates to a method of discriminating a frame number of a photographic film, and an apparatus therefor and, more particularly, to a method of, and an apparatus for, discriminating a picture frame number of a photographic film, which method and apparatus are suitable for use with a photographic printing apparatus, a photographic film inspection apparatus, or the like.

BACKGROUND OF THE INVENTION

Frame numbers in numerical figures and binary bar codes are optically recorded at the sides of each picture frame of a photographic disk film available in the market. In a disk film printing system, a binary code is read with an optical sensor and decoded into a frame number which is thereafter printed on the reverse of a developed photographic paper. If extra prints are requested, the frame number is inputted to the system by means of a keyboard so that the corresponding binary bar code is read with an optical sensor to then automatically set the identified picture frame at the printing position or station and perform exposures as many times as was instructed through the keyboard.

Since the recording positions of respective frames of a photographic disk film are specifically fixed, the picture frames and their numbers completely coincide with each other. However, a photographic roll film, e.g., a negative film of 135 size, is loaded in a camera in various manners as users change, and may be fed by various amounts for each picture frame. Thus, the recording positions on the negative film film may change so that the numerical figure frame numbers printed while manufacturing the film, at the sides of respective frames, are not in a one-to-one correspondence with the actually photographed frame number sequence, resulting in many inconveniences. For instance, if extra prints are requested, a printed photograph made during the first printing is visually compared with the negative film to distinguish the picture from other pictures and identify its frame number.

A known apparatus for facilitating such distinction records frame numbers on printed photographs at the time of first printing. For example, according to the apparatus disclosed in Japanese Patent Laid-Open Publication No. 56-128933, a mark is recorded on the center line of a start frame of a negative film and, thereafter, the frame number of a picture frame at the printing station is determined based on the transportation or movement quantity of the film after detection of the mark. The determined frame number is then printed at the peripheral blank portion of that frame or recorded on the reverse side of that print by using a character. Also, an apparatus has been proposed, for example, in Japanese Patent Laid-Open Publication No. 52-111718 in which if extra prints are requested, a numerical figure frame number is read with an optical character reader to identify the requested frame, and the frame is set at the film framing mask to print as many numbers as requested.

Problems associated with the above methods include a need for recording a start mark, and a complicated optical character reader. Such problems can be solved through introduction of a bar code representative of the frame number which is printed beforehand while manufacturing a film, at the side of a photographic film in a manner similar to that of a photographic disk film. Thus, the bar code can be read with an optical sensor disposed on the passage of the negative film to discriminate a frame number of a frame positioned at the negative framing mask.

In discriminating a picture frame number by reading the bar code, if an error read by the optical sensor occurs, there arises a new problem of the inability of discriminating a frame number of the picture frame positioned at the film framing mask. In the case where a plurality of frame numbers, e.g., "12" and "12A" are present within a single picture frame, it is generally desirable to select a frame number which is nearer to the center of the film framing mask. However, a conventional apparatus has no such selecting function.

OBJECT OF THE INVENTION

It is a principal object of the present invention to provide a method of and apparatus for discriminating a frame number of a photographic film which can discriminate frame numbers even when an error in reading the bar code frame number occurs, even if a frame number has been read correctly only once.

It is another object of the present invention to provide a method of and apparatus for discriminating a frame number of a photographic film which can select, from a plurality of frame numbers which are present within a single picture frame, the frame number nearer to the center of the film framing mask.

SUMMARY OF THE INVENTION

To achieve the above and other objects, and advantages of the present invention, a frame number of a negative film can be identified by causing a film framing film to move toward the negative mask, measuring the transportation quantity of the film in synchronism with reading a frame number bar code by a sensor, obtaining a distance from the read frame number to the center of the mask by using the measured transportation quantity, calculating the number of frames by dividing the obtained distance by the pitch between picture frame number bar codes, and calculating the frame number of a frame positioned at the film framing mask based on the number of frames and the read frame number.

If the division for calculating the number of frames produces a remainder m, m is compared with (B-m) where B is the pitch between frame number bar codes. If m is larger than (B-m), "1" is added to or subtracted from the calculated number of frames dependent on the direction of film transportation to obtain the frame number nearer to the center of the negative mask.

According to the picture present invention, the frame number of a frame positioned at the film framing mask is distinguished by the transportation quantity of the film after the frame number bar code was correctly read by the sensor. Therefore, even if the frame number has been read correctly only once, the frame numbers following the film can be identified correctly even if the bar codes cannot be read correctly. Further, the frame number can be discriminated irrespective of the film size. Furthermore, if a single frame has two frame numbers, the frame number nearer to the center of the negative mask can be identified.

BRIEF DESCRIPTION OF THE DRAWINGS

The above objects and advantages of the present invention will become more apparent from the following detailed description when read in conjunction with the accompanying drawings, in which.

DETAILED DESCRIPTION OF THE PREFERRED EMBODIMENTS

Figure 1:
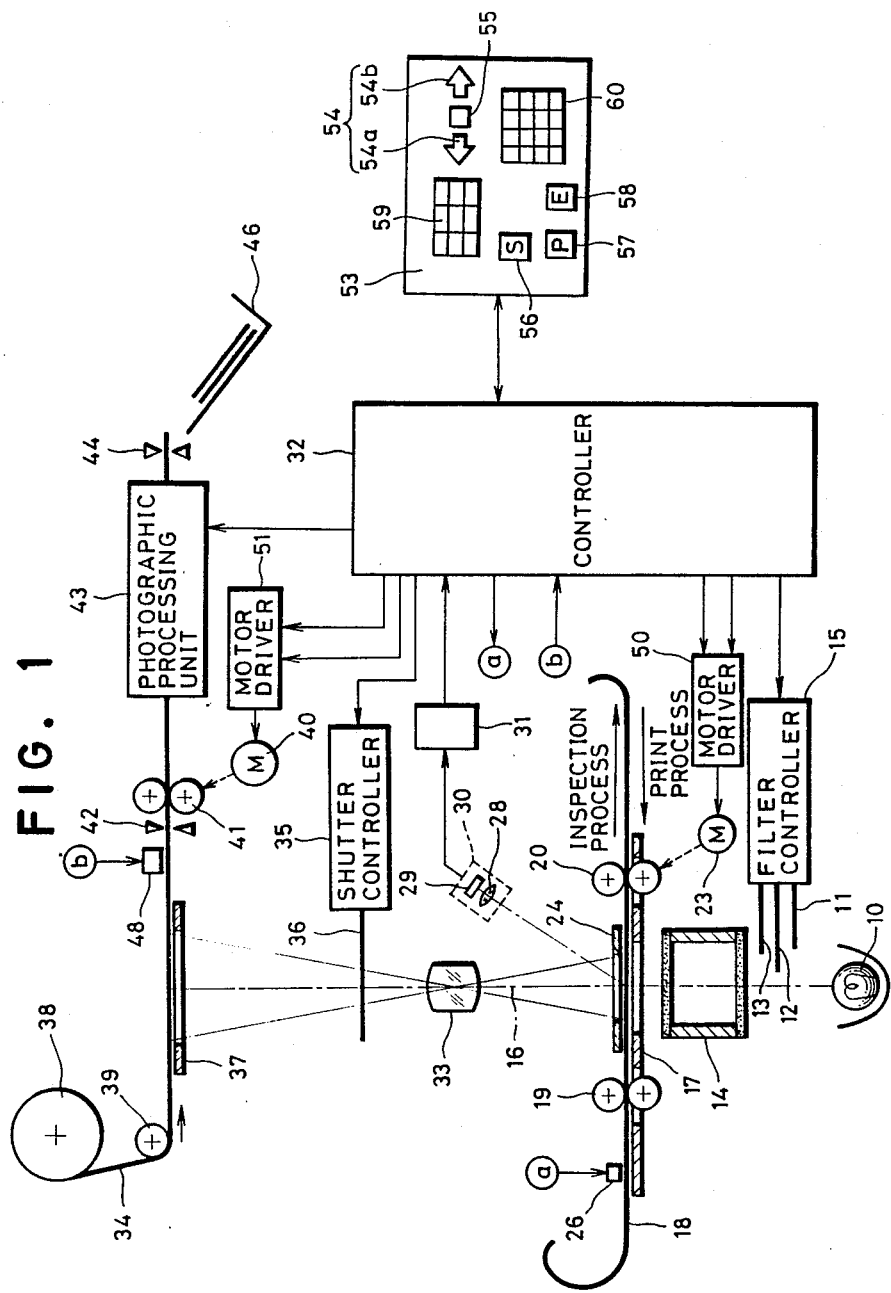
FIG. 1 is a schematic diagram showing a photographic printing apparatus embodying the present invention.

Referring to FIG. 1, a white light emitted from a light source 10 enters via a cyan filter 11, magenta filter 12, and yellow filter 13 to a mixing box 14. The quantity of insertion of the three color filters 11, 12, and 13 into an optical path 16 is controlled by a filter adjuster or controller 15 to regulate the proportion of the three color components and the intensity of a printing light. The rectangular-shaped mixing box 14 has an internal mirror surface and diffusion plates mounted on opposite end portions thereof to sufficiently diffuse a regulated printing light.

A film carrier 17 mounted at the printing station is set with a photographic film, e.g., negative film 18 to be irradiated with the light passed through the mixing box 14. The negative film 18 is transported from the left to the right relative to the printing station during an inspection process, and from the right to the left during a printing process, respectively, by pairs of feed rollers 19 and 20 mounted on both sides of the printing station. The feed rollers 19 and 20 are moved in cooperative association with chains or the like, and are rotated in the normal or reverse direction by a pulse motor 23. A film framing mask 24 is mounted on the printing station to make the film film 18 flat. The negative mask 24 has an aperture corresponding in size to the frame size, as is well known. The mask is lifted up by a solenoid (not shown) while the film 18 is moved, and pushed down to press the film 18 flat while it is printed.

Figure 2:
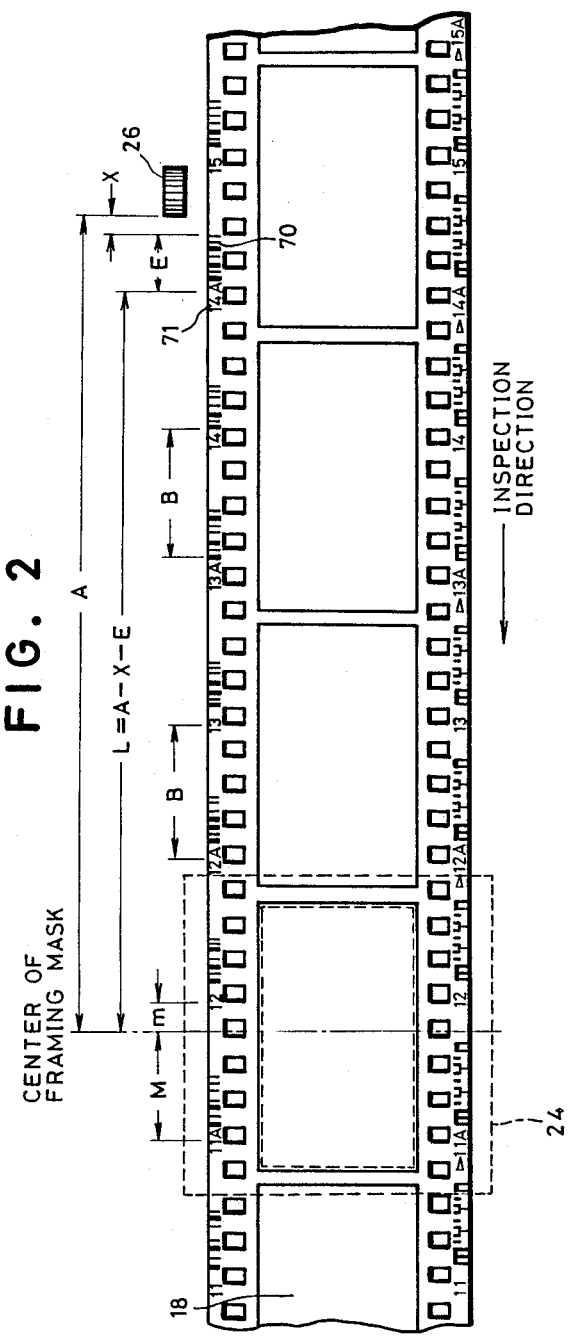
FIG. 2 illustrates the positional relationship among a film framing mask, sensor, and negative film.

A sensor 26 for reading the frame number bar code is mounted near the feed roller pair 19. FIG. 2 shows the film 18 seen from the light source 10 side, and the sensor 26 positioned apart from the center of the film mask 24, i.e., the center of the printing station, by an optical distance A. In this embodiment, a line image sensor is used as the sensor 26. However, other suitable sensors may be used depending upon the type of bar codes. "0" and "1" of the bar code are discriminated with two light receiving units spaced apart by the minimum width by judging if the two light receiving units output a same signal level. If a single light receiving unit is used, the widths can be discriminated with reference to the feed amount of the film 18.

As will be described later, the start bit of the frame number bar code is printed at the side portion of the film in alignment with the start bit of a DX code 56 representative of type of film. Therefore, it is also possible to pick up data by utilizing the clock truck of the DX code 56. A DX sensor for reading the DX code 56 is to be mounted on the film passage. To this end, two sensors, each constructed with four light receiving units of two rows and two columns may be mounted each on both sides of the film film 18 passage on one side of the negative mask 24, or four sensors may be mounted on both sides of the film mask 24.

A scanner 30 constructed of a lens 28 and an image area sensor 29 is mounted obliquely above the printing station to measure the transmitted light from each point of the negative image in the frame positioned at the printing station. The signal from the scanner 30 is sent to a characteristic value calculation unit 31 to calculate a mean transmission, maximum and minimum intensities, and the like for each color which are sent to a controller 32.

A printing lens 33 is mounted above the printing station to enlarge and focus the negative image in the frame onto a photographic paper 34. A shutter 36 controlled by a shutter driver 35 and a paper mask 37 are disposed between the printing lens 33 and the photographic paper 34. The paper 34 is pulled out from a paper roll 38 one frame after another, and delivered via a guide roller 39 to a pair of rollers 41 driven by a pulse motor 40. A cutter 42 is provided at the side of the paper mask 37 to cut the exposed portion of a predetermined number of frames. The exposed portion is sent to a photographic processing unit 43 where it is subjected to photographic processing, cut into frames, and ejected into a tray 46.

A printer 48 driven by signals from the controller 32 is mounted at the side of the exposure position to print the frame number on the reverse side of the exposed surface of the paper 34. The frame number is printed, for example, in the form of a dot pattern. Instead of the printer 48, a character printing unit constructed of a liquid panel, light emission diode array or the like may be mounted at the paper mask 37 to print a frame number, e.g., in the form of a dot pattern, at the marginal portion of the photographic paper simultaneously with negative image printing. Alternatively, a character printing apparatus may be provided in addition to the photographic printing apparatus, wherein read frame numbers are stored in a floppy disk or the like and, thereafter, the floppy disk and the developed paper are set in the character printing apparatus to print the frame numbers and, thereafter, the the developed paper 34 8s cut; and into pieces of frames.

The direction and quantity of rotation of the pulse motors 23 and 40 are controlled via the drivers 50 and 51 by the controller 32. The controller 32, constructed of a microcomputer, controls the filter adjuster or controller 15, shutter driver 35, and the like, and also determines the exposure amount based on the characteristic values and correction data.

A keyboard 53 is provided with a fine adjustment key 54 for finely adjusting the position of the negative film 18, a pass key 55 for feeding the film by one frame, a start key 56 for initiating the inspection process, a print start key 57 for initiating the printing process, an inspection end key 58, a correction key 59 for inputting correction data regarding the transmission intensity and color, an alphanumeric key 60, and the like. The fine adjustment key 54 includes two keys 54a and 54b for the normal and reverse feed directions respectively.

Figure 3:
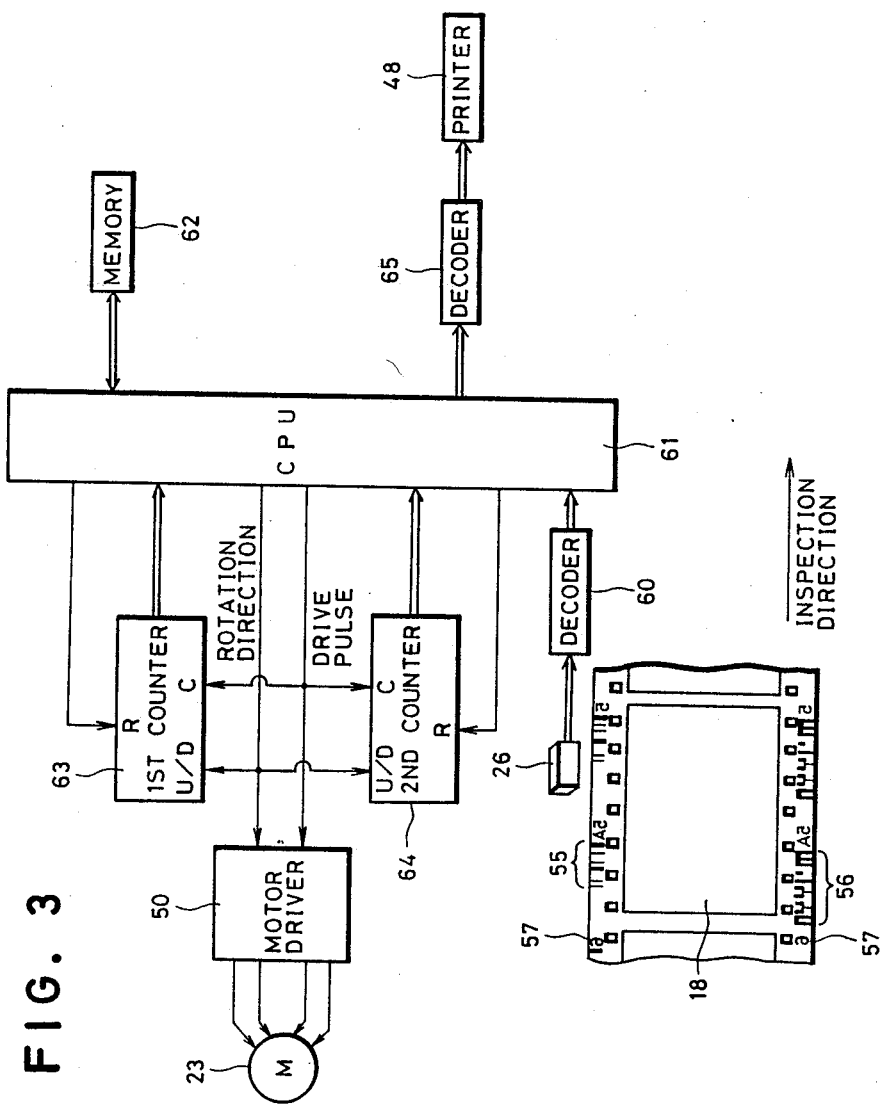
FIG. 3 is a block diagram of a unit for picking up frame position data and frame number data.

FIG. 3 shows a part of the controller, for use in reading a frame number and in printing it. The negative film 18 is printed with the frame number bar code 55 at one side thereof, and the DX code 56 at the other side. The frame number 57 is printed at both sides of the film 18. The frame number bar code is read by the sensor 26 and converted into binary numerical data with a decoder 60. These data are written in a memory 62 via a CPU 61. The content of the memory 62 is renewed every time a new frame number bar code 55 is read with the sensor 26 so that only the newest data are stored therein.

A first counter 63 is used for detecting the position of picture frame of the film 18, whereas a second counter 64 is used for counting the transportation quantity of the film after the bar code is correctly read. The first and second counters 63 and 64 count up or down drive pulses of the pulse motor 23 depending upon the rotation direction of the pulse motor 23. A pulse encoder may be coupled to the rollers, which rotate while the negative film 18 is transported, to thus count the pulses of the pulse encoder, instead of counting drive pulses of the pulse motor 23. The first counter 63 is reset upon actuation of the start key 56, whereas the second counter 64 is reset upon reading the frame number bar code 55.

The transportation quantity of the negative film 18 may be measured, without resetting the second counter 64, by comparing a reference count value of the counter 64 inputted to CPU 61 for a certain frame number with the count value at the time when a frame position is set. The decoder 65 is used for converting binary numerical data into frame numbers.

Instead of checking the position of picture frame based on the count of the first counter 63, a sensor for detecting a perforation may be provided, in which the number of perforations are counted, the first counter 63 is reset every time a perforation is detected, and the combination of the number of performations and the count of the first counter are used as the position data.

Figure 4:
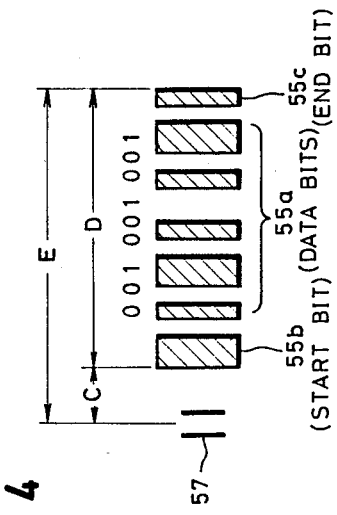
FIG. 4 shows an example of a frame number bar code.

FIG. 4 shows an example of a frame number bar codes. Various types of bar code have been proposed, any type of which may be used in this invention. For example, as a binary level type, Interleaved 2 of 5, Industrial 2 of 5, and Code 3 of 9 are known, and as a multi-level type, UPC and the like are known.

In this embodiment, Code 3 of 9 is used as the data bits 55a which are composed of five bars, and start and end bits 55b and 55c respectively are provided at opposite ends of the bar code to allow discrimination of the upper and lower most bits. Code 3 of 9 is constructed of bars and blanks alternatively disposed, the wider representing a binary numeral "1" and the narrower representing a binary numeral "0". Code 3 of 9 does not use a binary notation so that the odd and even of a decimal number cannot be determined from the lower most bit. The data bits 55a of the frame number bar code shown in FIG. 4 stand for "001001001" with binary numerals. This binary code corresponds to a decimal numeral of "22". The correspondence between frame number bar codes (represented by decimal notation for convenience sake) and frame numbers is shown in Table 1 by way of example.

TABLE 1

| Frame number bar code (Decimal Notation) | Frame number |
| --- | --- |
| 0 | S |
| 1 | SA |
| 2 | 1 |
| 3 | 1A |
| 4 | 2 |
| 5 | 2A |
| . | . |
| . | . |
| . | . |
| 24 | 12 |
| . | . |
| . | . |
| . | . |
| 28 | 14 |
| 29 | 14A |
| . | . |
| . | . |
| 73 | 36A |

A distance C from the center of the frame number 57 to the start bit 55b and a length D of the frame number bar code 55 take predetermined values. The pitches between frame number bar codes 55 and between frame number 57 take a constant value B, as shown in FIG. 2. The pitch B obviously is smaller than the pitch between frames.

Figure 5:
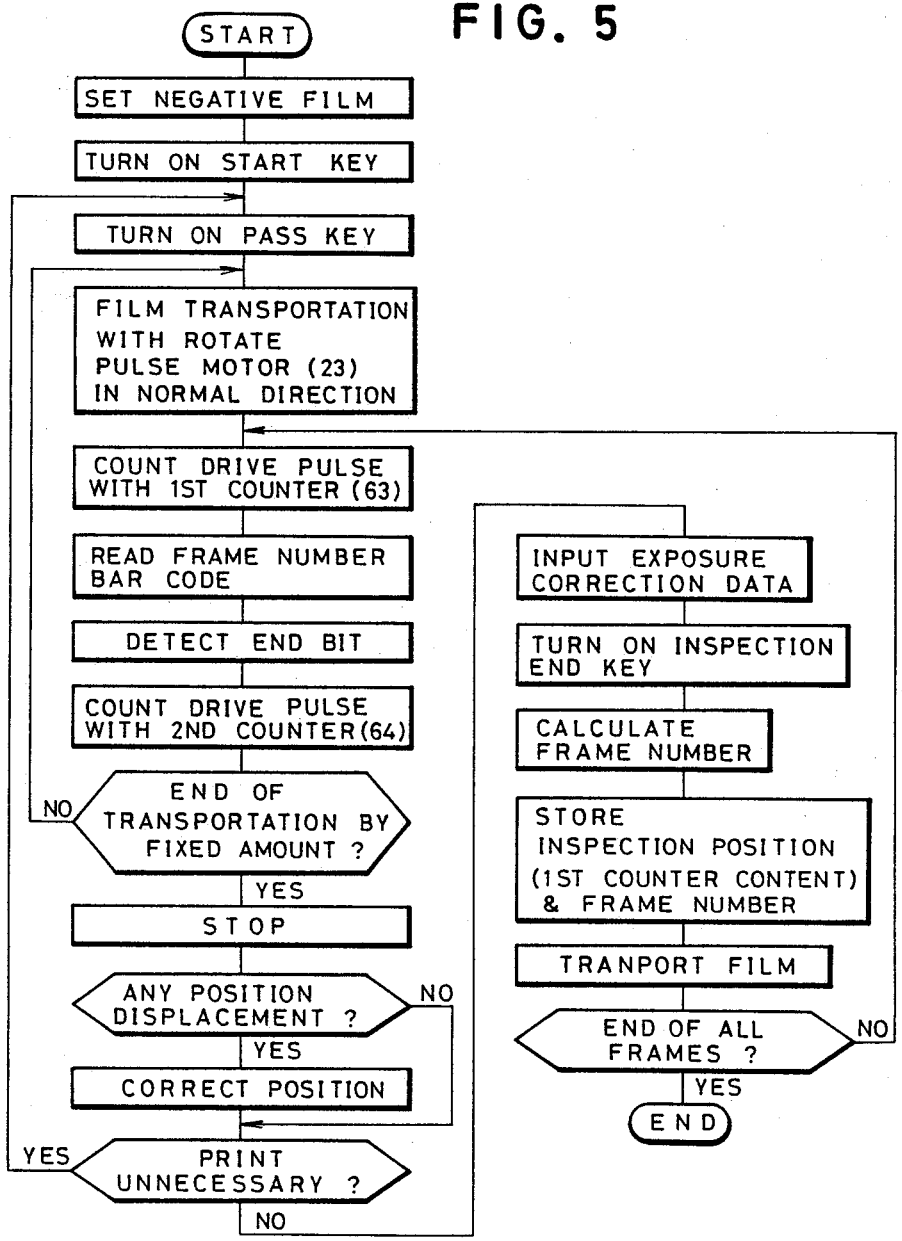
FIG. 5 is a flow chart showing the procedure of inspection process.

Next, the inspection process will be described with reference to FIGS. 2 and 5. As shown in FIG. 2, the film 18 is set on the film carrier 17 with the smallest frame number positioned at the top. The tip of the film 18 is nipped by the roller pair 19. Upon turning on of the start key 56, the controller 32 starts the sequence control for the inspection process, to illuminate the white light source 10 at a reduced intensity and reset the first counter 63.

Next, upon actuation of the pass key 55, a signal instructing the pulse motor 23 to rotate in the normal direction is outputted from CPU 61. The normal rotation signal is inputted to the first and second counters 63 and 64 to count up drive signals. CPU 61 sends a predetermined number of drive pulses to the driver 50 so that the pulse motor 23 is rotated in the normal direction by a predetermined amount. The rotation of the pulse motor 23 is transmitted to the two pairs of rollers 19 and 20 so that the negative film 18 is transported to the left as viewed in FIG. 2 during the inspection process. While the film 18 is transported, the first and second counters 63 and 64 count the drive pulses. The first counter 63 counts the drive pulses to measure the transportation quantity of the film 18.

As the start and end bits 55b and 55c are picked up at the predetermined positions of the sensor 26 while transporting the negative film 18, the frame number bar code 55 is read by the sensor 26. The read frame number bar code 55 is converted into binary numerical data by the decoder 60 and, thereafter, the data are written in the memory 62 via CPU 61. The decoder 60 sends a signal to CPU 61 when the end bit 55c is detected by the sensor 26. Upon reception of the signal, CPU 61 sends a reset signal to the second counter 64 to reset it. Thus, the second counter 64 can measure the transportation quantity X of the end bit 55c as illustrated in FIG. 2. As the sensor 26 repetitively reads the frame number bar codes 55, the content of the memory 62 is renewed thereby to store therein the last numerical data. The second counter 64, correspondingly, repeats its count operation. Obviously if an error occurs in reading frame number bar codes, the second counter 64 will not be reset, but will continue its count operation.

Upon completion of feeding the negative film 18 by a predetermined amount, the rotation of the pulse motor 23 stops. The negative film 18 is inspected through observation from the upper side of the film mask 24. In the inspection process, it is first picture checked to ensure that the first frame is aligned correctly with the printing station. If there is a deviation from the correct position, the fine adjustment key 54 matching the deviation direction is actuated to rotate slowly the pulse motor 23 in the normal or reverse direction and correct the position of the negative film 18. The first and second counters 63 and 54 count up during the normal rotation of the pulse motor 23, and count down during the reverse rotation, respectively, during the position correction operation.

Next, it is determined whether the frame correctly positioned at the film mask 24 is to be printed or not. If the frame has not photographed image, an out-of-focus image, or an excessively over- or under-exposed image, then it is determined that the frame is not to be printed. The unprinted frame is fed by one frame upon actuation of the pass key 55 to position the second frame at the printing station. For the frame which is to be printed, it is determined whether a subject failure will occur with the automatic exposure control. If it is judged that a subject failure will occur and the density and color of a main subject will become poor, then the density color correction key 59 is actuated to manually supply exposure correction data (printing conditions). The exposure correction data having been stored in the memory 62 together with the number of actuations of the inspection end key 58 to be used as the address data, are read in a print process to calculate the exposure amount.

After the negative film inspection process has been completed, the inspection end key 58 is actuated to determine the count of the second counter 64 and supply it to CPU 61. CPU 61 then discriminates the frame number nearer to the center of the negative mask 24, with reference to the count of the second counter 64 and the last binary numeral stored in the memory 62.

The discrimination of a frame number will be detailed with reference to FIG. 2. In FIG. 2, the last read frame number bar code is indicated at reference numeral 70, and the corresponding frame number "14A" is indicated at reference numeral 71. Reference character A represents the distance between the center of the film mask 24 (center of the printing station) and the sensor 26. In this embodiment, when the last pixel of the sensor 26 detects that the end bit 55c has passed through, the second counter 64 is reset to initiate a new count operation and to measure the transportation quantity X of the end bit 55c. Therefore, the distance A represents a distance to the last pixel of the sensor 26. However, the distance A may vary with the structure of the sensor, or other conditions.

A distance L from the center of the film mask 24 to the frame number 71 is given by:

$$L = (A - X - E) \tag{1}$$

The number of frame numbers n within the distance L and the remainder m can be obtained through division of the distance L by the pitch B between frame numbers.

$$L/B = n \text{ with remainder } m \tag{2}$$

The remainder m represents the distance from the frame number at the right of the center of the film mask 24 to this center. Since the pitch B between frame number is a constant value, the following equation stands assuming that the distance from the frame number at the left of the center of the film mask 24 to this center is M:

$$B - m = M \tag{3}$$

Therefore, it is possible to determine the frame number nearer to the center of the film mask 24, based on which is larger between M and m. In particular, assuming that the decoded numerical value of the read frame number bar code 70 is N, then the decoded value Y of the frame number bar code of a frame nearer to the center of the film mask 24 is given by:

for $m \leq M$ $$Y = N - n \tag{4}$$

for $m > M$ $$Y = N - n - 1 \tag{5}$$

For the above equations, the number of drive pulses is used as the unit of length or measuring distance. A meter or an inch may also be used as the measuring unit. Since the positional arrangement between the frame number 57 and the frame number bar code 55 is fixed, the distance from the last bar code 70, e.g., from the center of the bar code, to the center of the film mask 24 may be used as the distance L. Further, although the distance X is measured from the end bit 55c, the start bit 55a and other reference positions may be used as well.

Assuming that A=90, B=15, X=3, E=8, and N=29 by way of example for the case where the negative film 18 is positioned as shown in FIG. 2, $$L = 90 - 3 - 8 = 79$$

$$79/15 = 5 \text{ with remainder } 4$$

Since $4 \leq 11$, the equation (4) is applied with the values N and n being substituted thereto. Thus, $$Y = 29 - 5 = 24$$

The frame number for "24" in decimal notation of the decoded value of the frame number bar code becomes "12". Thus, the frame number corresponding to "24" is positioned nearer to the center of the negative mask 24 so that the real frame number is discriminated as "12".

It is also possible to discriminate a frame number by reading the frame number bar code 55 during the printing process where the negative film is transported to the right as seen in FIG. 2. In this case, instead of "−X" in the equation (1), "+X" is used.

After calculation of the frame number, the numerical data of the frame number are stored in the memory 62. In addition, the count of the first counter 63 is received by CPU 61 and stored in the memory 62 as the position data of the frame subjected to the negative film inspection. Thereafter, CPU 61 causes the pulse motor 23 to drive and feed the negative film 18 by one frame. As described so far, the negative film 18 is fed by a predetermined amount, and if necessary, the position adjustment and exposure correction data input are performed.

Figure 6:
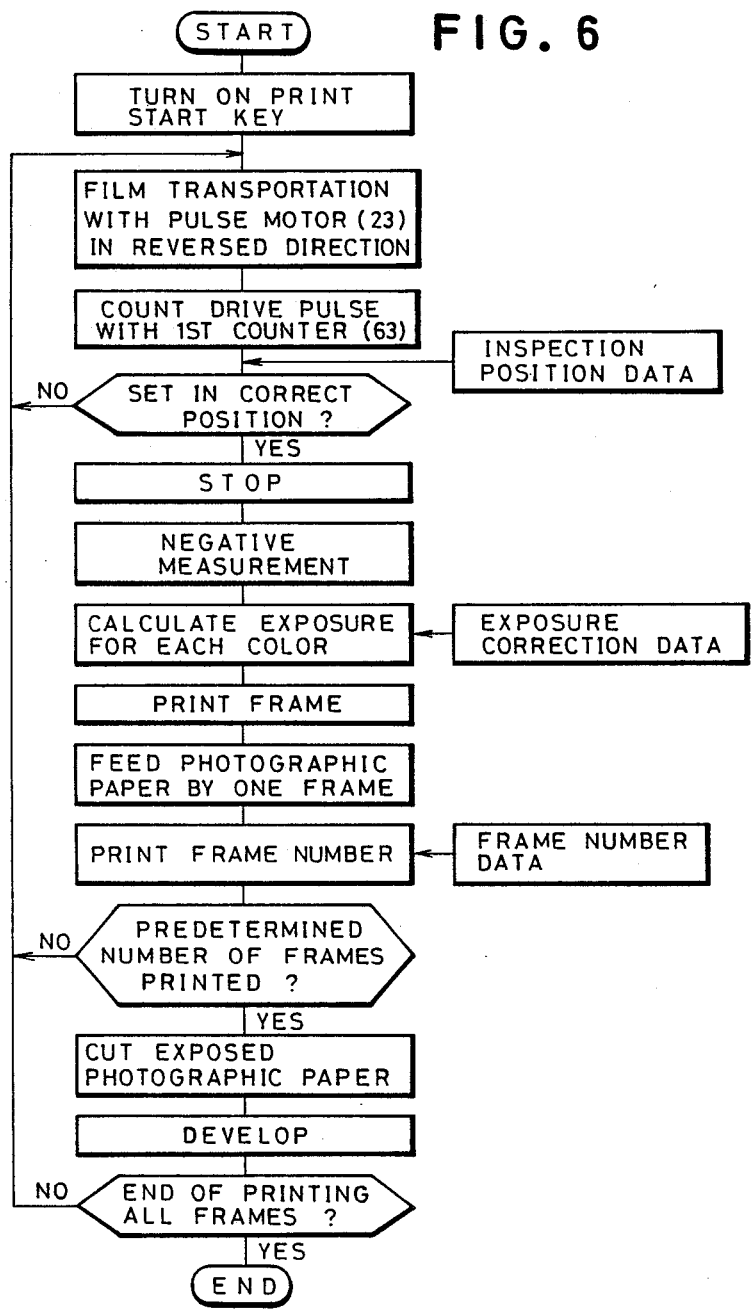
FIG. 6 is a flow chart showing the procedure of printing process.

After completion of the negative film inspection for all frames and upon actuation of the print start key 57, the printing process shown in FIG. 6 starts. In the printing process, the pulse motor 23 starts rotating in the reverse direction to make the negative film 18 move from the right to the left as seen in FIG. 1. While the film 18 is returned, drive pulses are inputted to the first counter 63 which counts down in response to the drive pulses so as to measure the present position of the negative film 18. Each frame is set at the printing position in accordance with the count of the first counter 1 and the position data read out from the memory 62.

In particular, for the first print, the position data of the last frame are read out from the memory 62, and when the data coincide with the count of the first counter 63, the reverse rotation of the pulse motor 23 stops. Thus, the last frame can be correctly positioned at the place where the film was stopped during the negative film inspection process.

After setting the last frame at the printing position, the controller 32 causes the scanner 30 to operate so as to measure the red, green, and blue light transmitted for each point of the negative image. The three color measured values are sent tto the characteristic value calculation unit 31 where they are converted into densities and then into sample average density value maximum and minimum density values specific point density and the like. These characteristic values are sent to the controller 32 which calculates the exposure amount based on the measured characteristic values and the exposure correction data stored in the memory 62. In accordance with the calculated exposure amount, the insertion quantity of the color filters 11 to 13 is adjusted. After this adjustment, the light source 10 emits light for a predetermined time at a full rate, with the shutter 36 opened, thereby to expose the photographic paper 34.

After the last frame print, the photographic paper 34 is fed by one frame to set the unexposed portion at the exposure position, and the color filters 11 to 13 are retracted to the standard positions by the filter adjuster or controller 15. The next frame position data are read out from the memory 62, and the frame is positioned at the film mask 24, as described before, to perform printing. Simultaneously with, or before or after the printing, CPU 61 reads out the frame number (numerical data) of the first printed frame from the memory 62 and sends it to the decoder 65. The decoder 65 converts the binary numerical data into the frame number data with reference to Table 1, and sends it to the printer 48. The printer 48 drives the printing head in accordance with the data of the inputted frame number to print the frame number, e.g., "36A" or "36" on the reverse of the first printed frame.

Each frame is printed in a similar manner as above. After a predetermined number of frames have been printed on the photographic paper 34, the cutter 42 operates to cut the exposed photographic paper 34 and sends it to the photographic processing unit 43. The exposed, cut photographic paper is then subjected to the photographic processing at unit 43 and, thereafter, it is cut into pieces of frames to be ejected into the tray 46.

In the above embodiment, light measuring is performed during the printing process. However, the light measuring and calculation of the exposure amount may be performed during the inspection process, and only the position alignment and printing may be carried out during the printing process. Further, in the above embodiment, although, the negative film is fed by a predetermined amount during the inspection process, the position alignment may be performed by detecting the edge (contour) of the frame with the image sensor 29. Preferably the predetermined amount frame feeding is used in combination with the method above so as to align the frame position even when a frame's edge cannot be detected.

Figure 7:
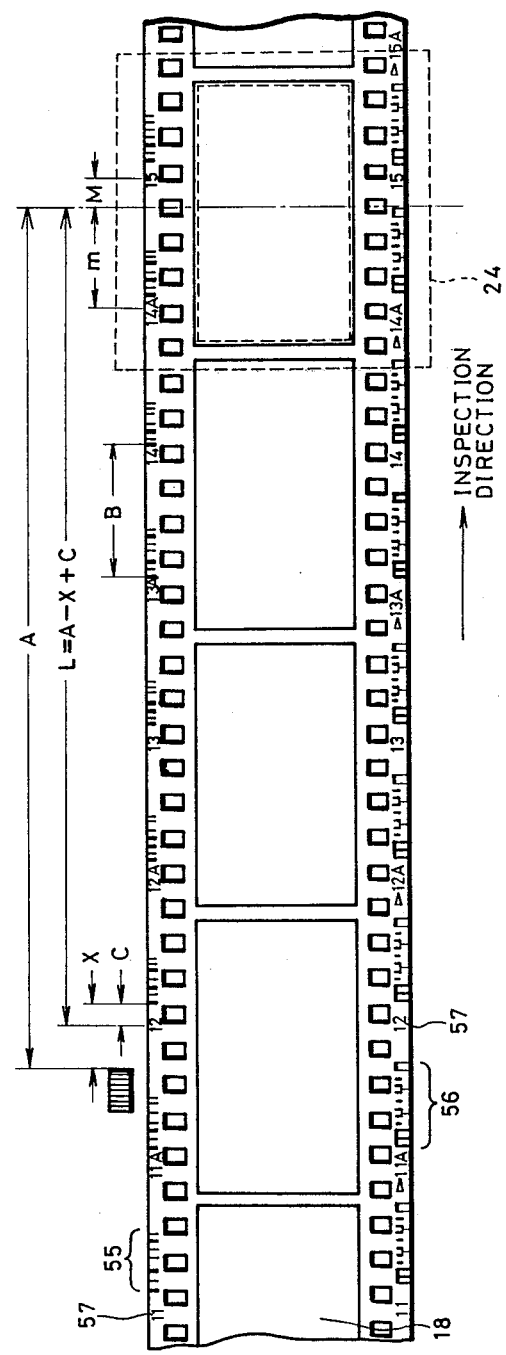
FIG. 7 shows the relation similar to that shown in FIG. 2, wherein the direction of negative film inspection is opposite to that shown in FIG. 2.

As shown in FIG. 7, if the sensor 26 is mounted on the opposite side of the negative film carrier 17, the film can be nipped by the feed roller pair 19, with the frame of the largest frame number positioned at the top. In this case, since the direction in reading the frame number is reversed, it becomes necessary to rearrange the bits of the bar code such that the upper most bit is positioned where the lower most bit was. In addition, the equations (1), (4), and (5) are modified as follows $$L = A - X + C \qquad (6)$$

for $m \leq M$ $$Y = N + n \qquad (7)$$

for $m > M$ $$Y = N + n + 1 \qquad (8)$$

Further, in reading the frame number bar code 55 during the printing process, "+X" is used instead of "−X".

If two sensors 26 are mounted at the opposite sides of the film carrier 17, the film 18 may be placed on the carrier with either the trailing edge or the leading edge of the film being positioned at the top, thus resulting in ready loading of the film on the carrier. In this case, it is necessary to rearrange the data bit arrangement in accordance with the sensor to be used.

Since the lower most bits of successive data bits of bar codes represented by binary notation are alternately changed between "1" and "0", the data bits may be used except for the lower most bit in the equations, and discrimination based on the lower most bit performed if the frame number is with or without "A".

In the above embodiment, the printer is used to print a frame number. Instead of the printer, a character printing apparatus may be used to print a frame number at the marginal portion outside of the frame. The present invention is applicable not only to printing a frame number, but also to discriminating a frame number for extra prints. Further, the negative film inspection process and the printing process are performed independently to carry out the printing. However, similar to a general photographic printing apparatus, the negative inspection, light measuring, printing, and frame number printing can be performed after the position alignment of a frame. Furthermore, the present invention is applicable not only to the photographic printing apparatus, but also to a negative film inspection apparatus. With such a negative film inspection apparatus, the exposure correction data or exposure amount data during the negative inspection process, and the discriminated frame number data are recorded or stored in a paper tape or a floppy disk. Such storage media and the negative film are set in the photographic printing apparatus to print a photograph and a frame number.

Although the present invention has been fully described in connection with the preferred embodiments thereof with reference to the accompanying drawings, it will be apparent to those skilled in the art that various changes and modifications of the present invention are possible within the scope of the following claims.

What is claimed is:

1. A method of discriminating a frame number of a film, the photographic film of which is printed with frame numbers and coded frame number bar codes, and the frame number bar code is read with a sensor to discriminate a frame number of a frame on a film mask, comprising the steps of:

measuring the transportation quantity of said film in synchronism with reading said frame number bar code; and calculating the frame number of a frame on said film mask in such a manner that a distance between the read frame number bar code or the associated frame number and the center of said film mask is obtained based on the transportation quantity of said film, the number of frames within said distance is obtained through division of said distance by a pitch between frame number bar codes, and the frame number of a frame on said film mask is calculated based on the number of frames and said read frame number.

2. A method of discriminating a frame number according to claim 1, wherein if a remainder m is present at the division for calculating the number of frames, said calculating means includes means for comparing m and (B-m) with each other as to judge which is larger, where B is the pitch between frame number bar codes, and if m is larger than (B-m), said calculating means adds to or subtracts from the calculated number of frames a "1" depending on the direction of transporting said film.

3. A method of discriminating a frame number according to claim 2, wherein said frame number bar code has at opposite ends thereof start and end bits.

4. A method of discriminating a frame number according to claim 3, wherein the transportation quantity of said film is a distance of movement of the start bit or end bit of a read frame number bar code from said sensor.

5. A method of discriminating a frame number according to claim 4, wherein said film is transported by using a pulse motor, and said transportation quantity is measured by counting drive pulses for said pulse motor with a counter.

6. A method of discriminating a frame number according to claim 5, wherein said counter is reset when said sensor reads said frame number bar code.

7. An apparatus for discriminating a frame number of a photographic film which is printed with frame numbers and coded frame number bar codes, and the frame number bar code is read with a sensor to discriminate a frame number of a frame on a film mask, comprising:

transportation means for transporting said film toward a film mask;

transportation quantity measuring means for measuring the transportation quantity of said film in synchronism with reading said frame number bar code with said sensor; and calculating means for calculating the frame number of a frame on said film mask in such a manner that a distance between the read frame number bar code, or the associated frame number, and the center of said film mask is obtained based on the transportation quantity of said film, the number of frames between said distance is obtained through division of said distance by a pitch between frame number bar codes, and the frame number of a frame on said film mask is calculated based on the number of frames on said read frame number.

8. An apparatus according to claim 7, wherein said transportation means comprises a pair of feed rollers for nipping said film and a pulse motor for rotating said rollers.

9. An apparatus according to claim 8, wherein said transportation quantity measuring means comprises a counter for counting drive pulses for said pulse motor, and means for resetting said counter when said sensor completely reads said frame number bar code.

10. An apparatus according to claim 8, wherein said transportation means further comprises a pulse encoder coupled to said feed rollers, and wherein said transportation quantity measuring means comprises a counter for counting pulses of said pulse encoder, and means for resetting said counter when said sensor completely reads said frame number bar code.

11. An apparatus according to claim 7, wherein if a remainder m is present at the division for calculating the number of frames, said calculating means includes means for comparing m and (B-m) with each other as judge which is larger, where B is the pitch between frame number bar codes, and if m is larger than (B-m), said calculating means adds to or subtracts from the calculated number of frames a "1" depending on the direction of transporting said film.

* * * * *